June 6, 1972 W. S. GREENWOOD 3,667,788
CAM LOCK DEVICE FOR TELESCOPING TUBING
Filed July 7, 1970 2 Sheets-Sheet 2
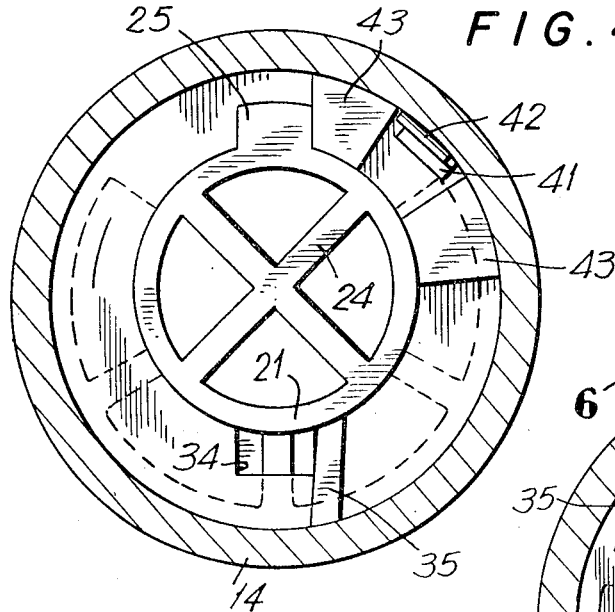
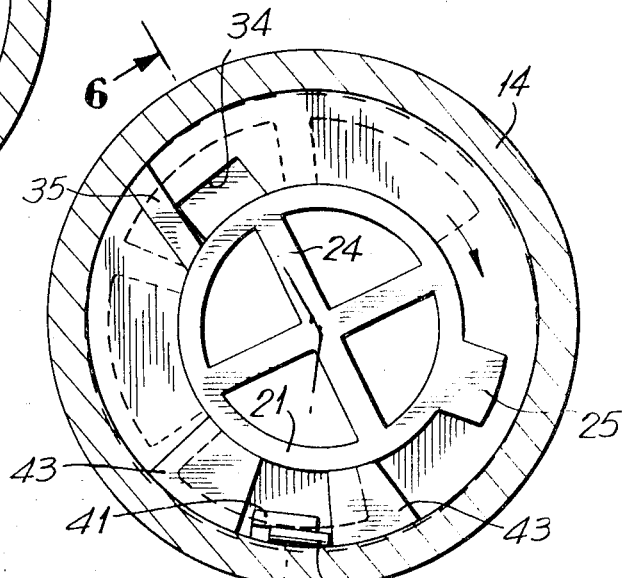
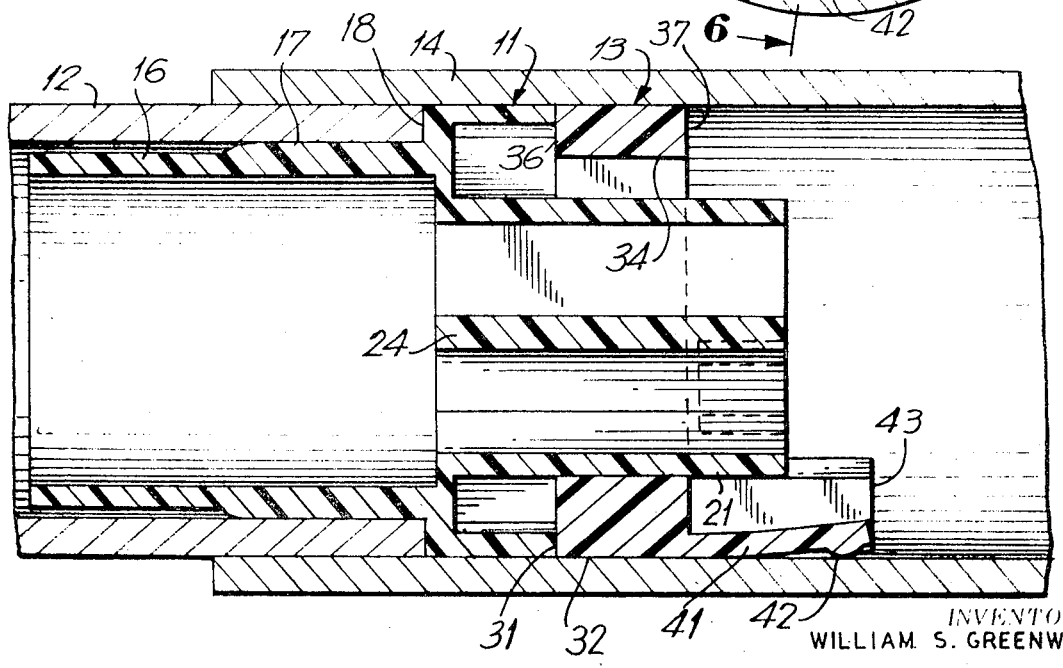
INVENTOR.
WILLIAM S. GREENWOOD
BY
Blum, Moscovitz, Friedman & Kaplan
ATTORNEYS

United States Patent Office 3,667,788
Patented June 6, 1972

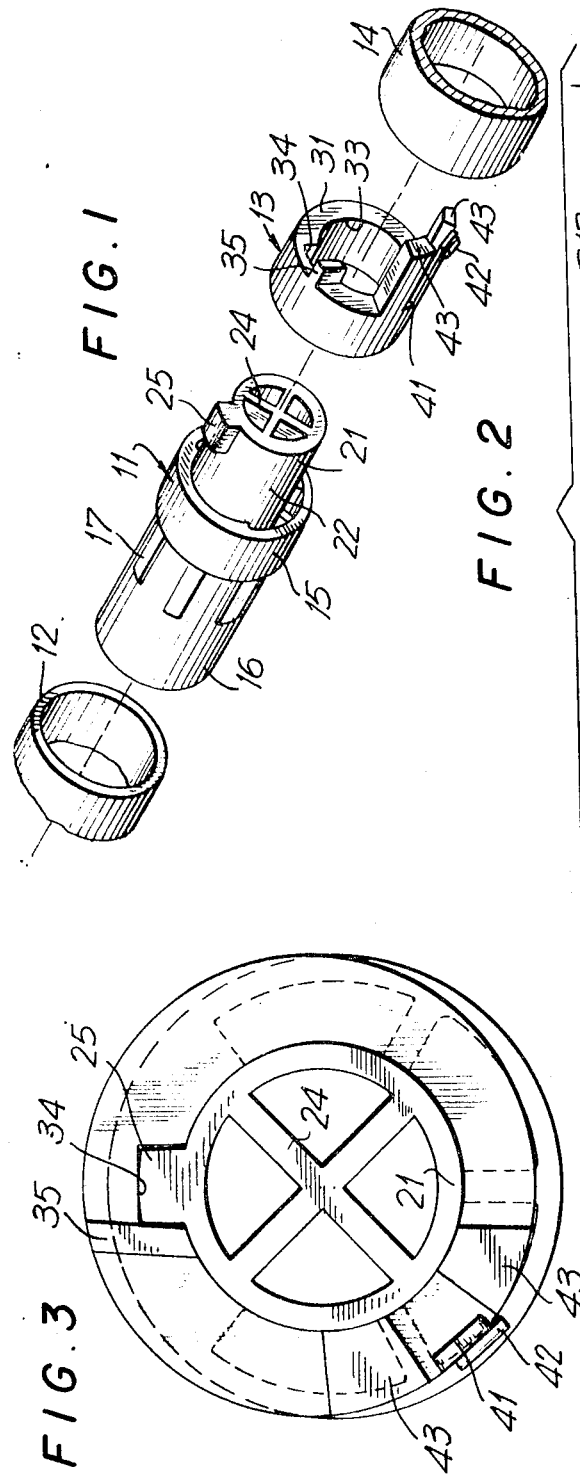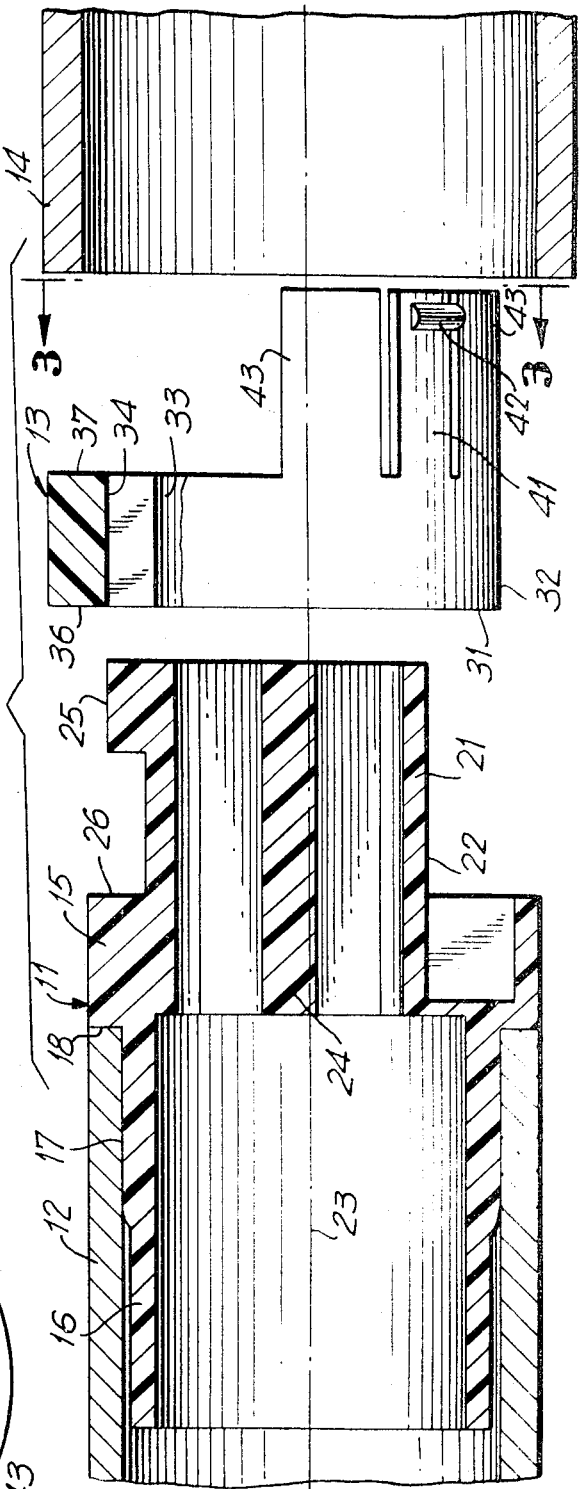

3,667,788
CAM LOCK DEVICE FOR TELESCOPING TUBING
William S. Greenwood, Nutley, N.J., assignor to
H & G Industries, Inc., Belleville, N.J.
Filed July 7, 1970, Ser. No. 52,903
Int. Cl. F16b 21/09
U.S. Cl. 287—58 CT
8 Claims

ABSTRACT OF THE DISCLOSURE

A two-piece cam lock device for telescoping tubing in which a first piece is fixed to the tubing of smaller diameter and the second piece is rotatable on the first piece between eccentric and concentric positions so as to be slideable within the tubing of larger diameter when the cam lock device is concentrically positioned and to frictionally prevent relative axial movement between the two lengths of tubing when the two pieces of the cam lock device are in eccentric relationship. Relative rotation of the tubing is effective to lock and unlock the cam lock device by rotating the two pieces between eccentric and concentric positions.

BACKGROUND OF THE INVENTION

This invention relates generally to a cam lock device for permitting two lengths of telescoping tubing to be axially adjusted with respect to one another and to be locked in any selected adjusted position. Such device can be utilized for extension poles, tripod legs and the like. While cam lock devices for such purpose are known in the art, such prior art devices are either of complex construction, or are difficult to use, such as by being capable of being locked in two directions of rotation, rendering it difficult for the user to find the unlocked position.

SUMMARY OF THE INVENTION

Generally speaking, in accordance with the invention, a two-piece cam lock device is provided having a fixed and a rotatable element. The rotatable element can be assembled to the fixed element in an eccentric position, which is well beyond the locking position, thereby preventing disassembly during normal use. The assembled element can be rotated to a stop, concentric position for assembly of the telescoping tubing or for adjustment thereof and relative rotation of the tubing effects movement of the rotatable element to a partially concentric position to provide a friction lock with the wall of the outer tubing to lock the telescoping tubing against axial displacement.

Accordingly, it is an object of this invention to provide a cam lock device for telescoping tubing of an improved construction.

Another object of the invention is to provide an improved cam lock device which is readily assembled in a highly eccentric position beyond the locking position to prevent disassembly of the cam lock device during normal use.

A further object of the invention is to provide an improved cam lock device capable of being locked in one direction only.

A further object of the invention is to provide a cam lock device having an improved wiper arrangement to assure rotation of the device during relative rotation of the tubing.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is an exploded, perspective view of a cam lock device and associated tubing constructed in accordance with the preferred embodiment of the instant invention;

FIG. 2 is an exploded, elevational view, at an enlarged scale, of the elements shown in FIG. 1;

FIG. 3 is an end elevational view looking in the direction of arrows 3—3 of FIG. 2;

FIG. 4 is a view similar to FIG. 3 but showing the cam lock device rotated to a concentric poistion;

FIG. 5 is a view similar to FIG. 4 but showing the cam lock device rotated to a locked position; and FIG. 6 is a sectional view taken along line 6—6 of FIG. 5.

DESCRIPTION OF THE PREFERRED EMBODIMENT

A fixed element 11 is adapted to be fixedly assembled to inner tube 12. A rotatable element 13 is rotatably mounted on fixed element 11 and the entire assembly of inner tube 12, fixed element 11 and rotatable element 13 are slidably received in outer tube 14. Outer tube 14 is axially moveable with respect to inner tube 12 with locking of the axial position of the outer tube with respect to the inner tube being accomplished by the cam lock device comprised of fixed element 11 and rotatable element 13.

Referring especially to FIGS. 1 through 3, fixed element 11 may be integrally molded of plastic material and is provided with an intermediate collar 15 whose outside diameter is slightly less than the inside diameter of outer tube 14. Extending into inner tube 12 from intermediate collar 15 is a tubular plug end 16 whose outside diameter is slightly less than the inside diameter of inner tube 12. A plurality of ribs 17 are formed on the surface of tubular plug end 16 to provide a press fit when the tubular plug end is pressed into inner tube 12 with the end of inner tube 12 in abutment with the shoulder 18 defined by the transition between tubular plug end 16 and intermediate collar.

A cylindrical journal or plug 21 extends outwardly from intermediate collar 15 with the cylindrical surface 22 of journal 21 being eccentrically positioned with respect to the longitudinal axis of fixed element 11. The longitudinal axis is indicated at 23. Plug 21 may be hollow and reinforced by cross ribs 24. A key 25 is formed on surface 22 adjacent the outer end of plug 21 with the key being located on that portion of eccentrically positioned cylindrical surface 22 that is furthest from longitudinal axis 23. Plug 21, being of smaller diameter than intermediate collar 15, defines therebetween a shoulder 26.

Rotatable element 13 may also be a one-piece plastic molded element. Rotatable element 13 has as its main component a ring 31 having a cylindrical outside surface 32 whose outside diameter is substantially equal to the outside diameter of intermediate collar 15. Ring 31 also includes a cylindrical inner surface 33 eccentrically positioned with respect to outside surface 32. The inside diameter of cylindrical surface 33 is substantially equal to or slightly greater than the outside diameter of cylindrical surface 22 on plug 21. The length of ring 31 is slightly less than the distance between shoulder 26 and the start of key 25 so that ring 31 may rotate about journal or plug 21.

At the position of maximum eccentricity between cylindrical surfaces 32 and 33, inner surface 33 is provided with a keyway 34 adapted to clear key 25. In other words, keyway 34 is located at the position where the distance between inner surface 33 and outer surface 32 is greatest. A projecting stop 35 extends axially of ring 31 adjacent keyway 34.

Rotatable element 13 may be assembled to fixed element 11 by sliding the rotatable element onto plug 21 with keyway 34 in alignment with key 25. In this position, maximum eccentricity between the fixed and rotatable elements will exist, such eccentricity being substantially greater than that required for locking the telescoping tubing, as will be hereafter described, the purpose of the aforesaid being the prevention of disassembly of the rotatable element from the fixed element during normal operation. In other words, when the rotatable element is mounted on the fixed element with end 36 of the rotatable element in abutment with shoulder 26, slight rotation of the rotatable element with respect to the fixed element will move the keyway 34 from its position opposite key 25 whereby the key will ride on end surface 37 and prevent removal of the rotatable element from the fixed element. Projecting stop 35 is adapted to be engaged by key 25 when the elements have been assembled whereby the rotatable element can rotate from the position shown in FIG. 3 in a counter-clockwise direction only.

A flexible finger 41 extends outwardly in an axial direction from end surface 37 with the outside surface of flexible finger 41 being an extension of cylindrical outside surface 32. A wiper 42 is formed at the outer end of flexible finger 41 for engagement with the inner surface of outer tube 14 as will be hereafter described. A pair of protecting fingers 43 spaced on opposite sides of flexible finger 41 are adapted to protect the flexible finger from damage during use.

Referring again to FIG. 3, rotatable element 13 is rotatable in a counter-clockwise direction from a position of maximum eccentricity to a position where one of the protecting fingers 43 abuts keys 25, thereby imparting a stop function to the protecting finger and the key. In this position, shown in FIG. 4, the outside surface 32 is fully concentric with intermediate collar 15, thereby forming a unit whose outside diameter is substantially that of the outside diameter of inner tube 12 and is slightly less than the inside diameter of outer tube 14 whereupon the outer tube may be telescopically received over the cam lock device and the inner tube. In this position, relative adjustment of the two tubes with respect to one another is possible and this is the adjusting position of the assembly. Also in this position, wiper 42 rubs against the inside surface of outer tube 14 and effects a slight deflection of the flexible finger. The resiliency of the flexible finger maintains the wiper in contact with the inner surface to provide a friction contact.

With inner tube 12 with fixed element 11 assembled thereto held in a fixed position, the outer tube, after it has been longitudinally adjusted to any desired position, can be physically rotated in a clockwise direction, as viewed in FIG. 4. Due to the frictional engagement between the inner surface of tube 14 and wiper 42, clockwise rotation of the outer tube will also effect a clockwise rotation of rotatable element 13 thereby moving cylindrical outer surface 32 from a concentric position to an eccentric position. As the eccentricity increases, a lateral displacement between the inner and outer tubes will take place and such lateral displacement will have a binding effect to lock the inner and outer tubes in the selected axial position. A fully locked position is represented by FIG. 5 and it will be noted therein that, in the fully locked position with all elements assembled, keyway 34 is not opposite key 25, thus preventing disassembly of rotatable element 13 from fixed element 11 if a force is applied axially to the inner and outer tubes in an attempt to pull them apart.

From the foregoing, it is noted that rotation in one clockwise rotation of the outer tube as viewed in FIG. 5 direction effects a locking of the two tubes. Counter- will restore rotatable element 13 to the concentric position as a result of frictional contact between cylindrical outside surface 32 and wiper 42 and the inside surface of outer tube 14. When the counter-clockwise rotation reaches the stop position resulting from engagement of one of the protecting fingers 43 with key 25, the concentric position will have been attained and axial adjustment of the tubes is possible.

The foregoing description has reference to a single joint only but it will be understood that a plurality of joints assembling a plurality of tubes in telescoping relationship is possible. If a tube is mounted within outer tube 14 so that it might come into contact with flexible finger 41, the protecting fingers 43 will prevent damage to the flexible finger.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A cam lock device for a pair of telescopic tubes aligned on a longitudinal axis, comprising a fixed element fixedly mounted in an end of the tube of smaller diameter, said fixed element including a cylindrical journal extending axially away from said tube of smaller diameter and eccentrically positioned with respect to said longitudinal axis and a key at the outer end of said cylindrical journal, and a rotatable element mounted on said cylindrical journal and having an outside surface, a cylindrical inside surface and a keyway, the maxium outside diameter of said outer surface being slightly less than the inside diameter of the tube of larger diameter, said cylindrical inside surface being eccentrically positioned with respect to said outside surface, and said keyway being positionable over said key, said fixed element and smaller diameter tube assembly including a shoulder, said key being spaced from said shoulder to receive therebetween said rotatable element, said key preventing removal of said rotatable element from said fixed element except when said key and keyway are in alignment, and rotation of said rotatable element in a selected direction on said cylindrical journal serving to lock said telescopic tubes in a selected axial position.

2. A cam lock device as claimed in claim 1 wherein said rotatable element includes a stop adjacent one side of said keyway in the path of said key to limit rotation of said rotatable element from the aligned keyway position to movement in one direction only.

3. A cam lock device as claimed in claim 1 wherein said key and keyway are positioned to locate said outer surface at maximum eccentricity when said key and keyway are in alignment.

4. A cam lock device as claimed in claim 1 wherein said rotatable element includes stop means in the path of movement of said key, said stop means being located to limit rotation of said rotatable element further away from the key and keyway alignment position when said outside surface is substantially concentric with the outside surface of the tube of smaller diameter.

5. A cam lock device as claimed in claim 1 wherein said rotatable element includes wiper means for frictionally engaging the inside surface of the tube of larger diameter to apply a rotatable force to said rotatable element during rotation of the tube of large diameter.

6. A cam lock device as claimed in claim 5 wherein said wiper means includes a flexible finger extending from said rotatable element in a direction substantially parallel to said longitudinal axis, at least a portion of said flexible surface extending radially beyond said outside surface of said rotatable element.

7. A cam lock device as claimed in claim 6 wherein the outside surface of said flexible finger is located as an extension of said outside surface of said rotatable element and wherein said portion includes a projection located substantially at the free end of said flexible finger.

8. A cam lock device as claimed in claim 6 wherein said rotatable element includes guard means located adjacent said flexible finger for protecting said flexible finger from damage by axially-directed forces.

References Cited

UNITED STATES PATENTS

| | | | |
|---|---|---|---|
| 2,526,415 | 10/1950 | Refsdal | 287—58 CT |
| 2,922,667 | 1/1960 | Lanciano, Jr. | 285—302 X |
| 2,473,351 | 6/1949 | Thompson et al. | 287—58 CT X |
| 2,546,157 | 3/1951 | Hume | 287—58 CT |
| 2,991,096 | 7/1961 | Davidson | 287—58 CT |

FOREIGN PATENTS

| | | | |
|---|---|---|---|
| 857,344 | 12/1960 | Great Britain | 339—90 |

DAVID J. WILLIAMOWSKY, Primary Examiner

D. H. CORBIN, Assistant Examiner

U.S. Cl. X.R.

285—178; 287—Digest 8